(12) United States Patent
Vinson et al.

(10) Patent No.: US 11,030,315 B2
(45) Date of Patent: Jun. 8, 2021

(54) SYSTEMS, METHODS, AND COMPUTER PROGRAM PRODUCTS FOR MANAGING DISABLING OF SERVICES

(71) Applicant: Google LLC, Mountain View, CA (US)

(72) Inventors: Yale P. Vinson, Flower Mound, TX (US); Scott T. Mulloy, Monroe, CT (US); Balamourougan Ranganathan, Cumming, GA (US)

(73) Assignee: Google LLC, Mountain View, CA (US)

( * ) Notice: Subject to any disclaimer, the term of this patent is extended or adjusted under 35 U.S.C. 154(b) by 1221 days.

(21) Appl. No.: 14/278,120

(22) Filed: May 15, 2014

(65) Prior Publication Data

US 2014/0351121 A1    Nov. 27, 2014

Related U.S. Application Data

(60) Provisional application No. 61/825,870, filed on May 21, 2013.

(51) Int. Cl.
| | |
|---|---|
| *G06F 21/57* | (2013.01) |
| *G06F 21/50* | (2013.01) |
| *G06Q 20/32* | (2012.01) |
| *G06Q 20/36* | (2012.01) |

(52) U.S. Cl.
CPC .............. *G06F 21/57* (2013.01); *G06F 21/50* (2013.01); *G06Q 20/3227* (2013.01); *G06Q 20/36* (2013.01)

(58) Field of Classification Search
CPC ..................................................... G06F 21/57
See application file for complete search history.

(56) References Cited

U.S. PATENT DOCUMENTS

| | | | |
|---|---|---|---|
| 5,590,038 A | 12/1996 | Pitroda | 395/241 |
| 5,640,002 A | 6/1997 | Ruppert et al. | 235/472 |
| 5,748,740 A | 5/1998 | Curry et al. | 380/25 |
| 5,805,702 A | 9/1998 | Curry et al. | 380/24 |

(Continued)

FOREIGN PATENT DOCUMENTS

| | | |
|---|---|---|
| CA | 2 381 614 A1 | 3/2001 |
| EP | 1 222 503 A2 | 7/2002 |

(Continued)

OTHER PUBLICATIONS

Becamel, "International Preliminary Report on Patentability issued in International Application No. PCT/US2014/038080", dated Dec. 3, 2015, 8 pages.

(Continued)

*Primary Examiner* — Jacob C. Coppola
(74) *Attorney, Agent, or Firm* — Dority & Manning, P.A.

(57) ABSTRACT

A system, method, and computer readable storage medium for managing applications on a secure element. A request to modify the availability state of a version of a service, the availability state of the service being stored in a memory, is received. The availability state of the version of the service stored in the memory is modified in accordance with the request. More specifically, the availability state is modified to: (i) unavailable in a case where the request includes an instruction to disable the version of the service, and (ii) available in a case where the request includes an instruction to enable the version of the service. The service is associated with a secure element profile.

12 Claims, 6 Drawing Sheets

(56) References Cited

U.S. PATENT DOCUMENTS

| | | | |
|---|---|---|---|
| 5,884,271 A | 3/1999 | Pitroda | 705/1 |
| 5,901,303 A | 5/1999 | Chew | 395/400 |
| 5,940,510 A | 8/1999 | Curry et al. | 380/25 |
| 5,949,880 A | 9/1999 | Curry et al. | 380/24 |
| 6,073,840 A | 6/2000 | Marion | 235/381 |
| 6,105,013 A | 8/2000 | Curry et al. | 705/65 |
| 6,116,505 A | 9/2000 | Withrow | 235/381 |
| 6,131,811 A | 10/2000 | Gangi | 235/380 |
| 6,237,095 B1 | 5/2001 | Curry et al. | 713/178 |
| 6,422,464 B1 | 7/2002 | Terranova | 235/384 |
| 6,587,835 B1 | 7/2003 | Treyz et al. | 705/14 |
| 6,601,759 B2 | 8/2003 | Fife et al. | 235/375 |
| 6,671,358 B1 | 12/2003 | Seidman et al. | 379/93.12 |
| 6,732,081 B2 | 5/2004 | Nicholson | 705/14 |
| 6,769,607 B1 | 8/2004 | Pitroda et al. | 235/380 |
| 6,789,103 B1 * | 9/2004 | Kim | H04L 41/085 707/999.009 |
| 6,813,609 B2 | 11/2004 | Wilson | 705/14 |
| 6,837,436 B2 | 1/2005 | Swartz et al. | 235/472.02 |
| 6,925,439 B1 | 8/2005 | Pitroda | 705/1 |
| 7,083,094 B2 | 8/2006 | Cooper | 235/449 |
| 7,110,792 B2 | 9/2006 | Rosenberg | 455/558 |
| 7,127,236 B2 | 10/2006 | Khan et al. | 455/414.1 |
| 7,155,405 B2 | 12/2006 | Petrovich | 705/26 |
| 7,194,422 B1 | 3/2007 | Killick | 705/14 |
| 7,216,109 B1 | 5/2007 | Donner | 705/64 |
| 7,249,112 B2 | 7/2007 | Berardi et al. | 705/79 |
| 7,286,818 B2 | 10/2007 | Rosenberg | 455/414.1 |
| 7,298,271 B2 | 11/2007 | Sprogis | 340/572.1 |
| 7,308,426 B1 | 12/2007 | Pitroda | 705/35 |
| 7,330,714 B2 | 2/2008 | Rosenberg | 455/412.1 |
| 7,349,885 B2 | 3/2008 | Gangi | 705/41 |
| 7,469,151 B2 | 12/2008 | Khan et al. | 455/558 |
| 7,469,381 B2 | 12/2008 | Ording | 715/702 |
| 7,483,858 B2 | 1/2009 | Foran et al. | 705/39 |
| 7,494,055 B2 | 2/2009 | Fernandes et al. | 235/380 |
| 7,529,563 B1 | 5/2009 | Pitroda | 455/558 |
| 7,571,139 B1 | 8/2009 | Giordano et al. | 705/40 |
| 7,581,678 B2 | 9/2009 | Narendra et al. | 235/451 |
| 7,613,628 B2 | 11/2009 | Ariff et al. | 705/14 |
| 7,631,810 B2 | 12/2009 | Liu et al. | 235/451 |
| 7,693,752 B2 | 4/2010 | Jaramillo | 705/26 |
| 7,708,198 B2 | 5/2010 | Gangi | 235/380 |
| 7,712,658 B2 | 5/2010 | Gangi | 235/380 |
| 7,775,430 B2 | 8/2010 | Lin | 235/383 |
| 7,805,615 B2 | 9/2010 | Narendra et al. | 713/186 |
| 7,828,214 B2 | 11/2010 | Narendra et al. | 235/451 |
| 7,856,377 B2 | 12/2010 | Cohagan et al. | 705/14.3 |
| 7,864,163 B2 | 1/2011 | Ording et al. | 345/173 |
| 7,942,337 B2 | 5/2011 | Jain | 235/492 |
| 7,954,715 B2 | 6/2011 | Narendra et al. | 235/451 |
| 7,954,716 B2 | 6/2011 | Narendra et al. | 235/451 |
| 7,954,717 B2 | 6/2011 | Narendra et al. | 235/451 |
| 7,961,101 B2 | 6/2011 | Narendra et al. | 340/572.1 |
| 7,967,215 B2 | 6/2011 | Kumar et al. | 235/492 |
| 7,991,158 B2 | 8/2011 | Narendra et al. | 380/260 |
| 8,072,331 B2 | 12/2011 | Narendra et al. | 340/572.1 |
| 8,083,145 B2 | 12/2011 | Narendra et al. | 235/451 |
| 8,091,786 B2 | 1/2012 | Narendra et al. | 235/492 |
| 8,131,645 B2 | 3/2012 | Lin et al. | 705/51 |
| 8,140,418 B1 | 3/2012 | Casey et al. | 705/35 |
| 8,396,808 B2 | 3/2013 | Greenspan | 705/64 |
| 8,429,046 B2 | 4/2013 | Pitroda | 705/35 |
| 8,661,430 B2 * | 2/2014 | Oh | G06F 21/10 713/167 |
| 8,811,971 B2 * | 8/2014 | Corda | G06F 21/79 380/274 |
| 8,918,775 B1 * | 12/2014 | Carpenter | G06F 9/44505 709/203 |
| 9,064,120 B2 * | 6/2015 | Satish | G06F 8/60 |
| 9,665,729 B2 * | 5/2017 | Bruno | G06F 21/6209 |
| 2002/0049631 A1 | 4/2002 | Williams | 705/14 |
| 2002/0082921 A1 | 6/2002 | Rankin | 705/14 |
| 2002/0174025 A1 | 11/2002 | Hind et al. | 705/26 |
| 2002/0179703 A1 | 12/2002 | Allen | 235/381 |
| 2003/0009382 A1 | 1/2003 | D'Arbeloff et al. | 705/17 |
| 2003/0083042 A1 | 5/2003 | Abuhamdeh | 455/406 |
| 2003/0115126 A1 | 6/2003 | Pitroda | 705/36 |
| 2003/0132298 A1 | 7/2003 | Swartz et al. | 235/472.02 |
| 2003/0200489 A1 | 10/2003 | Hars | 714/703 |
| 2004/0073519 A1 | 4/2004 | Fast | 705/65 |
| 2004/0186768 A1 | 9/2004 | Wakim et al. | 705/14 |
| 2004/0203684 A1 | 10/2004 | Jokinen et al. | 455/418 |
| 2005/0004866 A1 | 1/2005 | Bonalle et al. | 705/39 |
| 2005/0171898 A1 | 8/2005 | Bishop et al. | 705/39 |
| 2005/0222961 A1 | 10/2005 | Staib et al. | 705/64 |
| 2005/0234769 A1 | 10/2005 | Jain et al. | 705/14 |
| 2005/0247777 A1 | 11/2005 | Pitroda | 235/380 |
| 2005/0262494 A1 * | 11/2005 | Fung | G06F 8/656 717/170 |
| 2006/0119884 A1 | 6/2006 | Choi | 358/1.15 |
| 2006/0287004 A1 | 12/2006 | Fuqua | 455/558 |
| 2007/0014407 A1 | 1/2007 | Narenda et al. | 380/259 |
| 2007/0014408 A1 | 1/2007 | Narenda et al. | 380/270 |
| 2007/0198432 A1 | 8/2007 | Pitroda et al. | 705/64 |
| 2008/0051076 A1 * | 2/2008 | O'Shaughnessy | G06F 21/305 455/419 |
| 2008/0306849 A1 | 12/2008 | Johnson, Jr. et al. | 705/35 |
| 2009/0108064 A1 | 4/2009 | Fernandes et al. | 235/380 |
| 2009/0164322 A1 | 6/2009 | Khan et al. | 705/14 |
| 2010/0146497 A1 * | 6/2010 | Kogan | G06F 8/65 717/170 |
| 2010/0198939 A1 | 8/2010 | Raleigh | 709/217 |
| 2010/0241494 A1 | 9/2010 | Kumar et al. | 705/14.1 |
| 2010/0246597 A1 | 9/2010 | Ma et al. | 370/431 |
| 2010/0262959 A1 * | 10/2010 | Bruno | G06F 21/6209 717/171 |
| 2010/0330958 A1 * | 12/2010 | Corda | G06F 21/79 455/410 |
| 2011/0073663 A1 | 3/2011 | Narendra et al. | 235/492 |
| 2011/0171996 A1 | 7/2011 | Narendra et al. | 455/558 |
| 2011/0223972 A1 | 9/2011 | Narendra et al. | 455/558 |
| 2011/0231238 A1 | 9/2011 | Khan et al. | 705/14.26 |
| 2011/0239304 A1 * | 9/2011 | Saarisalo | G06F 21/57 726/26 |
| 2011/0244796 A1 | 10/2011 | Khan et al. | 455/41.1 |
| 2011/0269438 A1 | 11/2011 | Narendra et al. | 455/414.1 |
| 2011/0271044 A1 | 11/2011 | Narendra et al. | 711/103 |
| 2011/0272468 A1 | 11/2011 | Narendra et al. | 235/492 |
| 2011/0272469 A1 | 11/2011 | Narendra et al. | 235/492 |
| 2012/0064828 A1 | 3/2012 | Khan et al. | 455/41.1 |
| 2012/0109764 A1 | 5/2012 | Martin et al. | 705/17 |
| 2012/0323664 A1 | 12/2012 | Klems | 705/14.26 |
| 2013/0151400 A1 * | 6/2013 | Makhotin | G06Q 20/3227 705/39 |
| 2014/0298322 A1 * | 10/2014 | Gargiulo | G06F 8/61 717/175 |

FOREIGN PATENT DOCUMENTS

| | | | |
|---|---|---|---|
| EP | 0 766 852 B1 | 8/2004 | |
| EP | 1 412 890 A4 | 11/2004 | |
| EP | 1 477 943 A2 | 11/2004 | |
| WO | WO 01/18629 A3 | 3/2001 | |
| WO | WO 03/012717 A1 | 2/2003 | |
| WO | WO-2012091348 A2 * | 7/2012 | G06F 21/71 |
| WO | 2014/189748 A1 | 11/2014 | |

OTHER PUBLICATIONS

Int'l Search Report and Written Opinion issued in connection with Int'l Appl'n No. PCT/US2014/038080 dated Sep. 24, 2014 (15 pages).

\* cited by examiner

SYSTEMS, METHODS, AND COMPUTER PROGRAM PRODUCTS FOR MANAGING DISABLING OF SERVICES

CROSS REFERENCE TO RELATED APPLICATION

This application claims priority to U.S. Provisional Application No. 61/825,870 filed May 21, 2013, the contents of which are incorporated herein by reference.

BACKGROUND

Field

The present invention generally relates to managing applications on a secure element. More particularly, the present invention relates to systems, methods, and computer program products for managing the availability states of those applications.

Related Art

Mobile commerce is a rapidly growing industry in which users, through their mobile devices, purchase items in-store or online. To make these purchases, a mobile wallet is installed on a user's mobile device. The mobile wallet connects the user's bank account or credit cards to their mobile device. With the aid of a near-field communication chip (NFC), a user can use his/her mobile device to pay for goods and services from brick-and-mortar stores by contactlessly interacting with a NFC payment system. The mobile wallet itself is an application stored on the mobile device. Sensitive user information, in addition to one or more mobile commerce applications, may be stored on a secure element on the mobile device. The mobile commerce applications may originate from different sources, including service providers (e.g., a merchant, a banking institution, or a credit card company) or an operator of a mobile network over which the mobile device communicates (also referred to as a mobile network operator (MNO)).

Mobile commerce applications are occasionally updated with newer versions, which are then delivered to the mobile devices. There is the potential, however, that an unforeseen issue may arise with an updated version of an application which may cause the user's mobile device to malfunction, or be rendered inactive altogether (commonly referred to as "bricking" a device). Considering that many mobile devices automatically update themselves, or are routinely updated by their users, a defective version may quickly propagate through a user community. Thus, with the release of each new version of an application, there is a potential for a cascading failure. To minimize this risk, new versions of applications are tested extensively. Nevertheless, such testing cannot guarantee that an issue will not arise. Therefore, it would be advantageous to be able to stem the distribution of defective applications once a defect it discovered. Moreover, it would also be advantageous to quickly and efficiently stop the rollout of a defective application with minimal effort.

BRIEF DESCRIPTION

The present invention provides systems, methods, and computer program products for managing the availability states of applications on secure elements.

In one embodiment, a method of managing the availability of a service includes at least one receiving and modifying step. A request to modify an availability state of a version of the service is received. The availability state of the version of the service is stored in the memory and is modified in accordance with the request. The availability state is modified to: (i) unavailable in a case where the request includes an instruction to disable the version of the service, and (ii) available in a case where the request includes an instruction to enable the version of the service. The service is associated with a secure element profile.

In another embodiment, a data processing system for managing the availability of a service includes at least one memory that stores an availability state of a version of the service, a communication unit, and a processor. The communication unit is configured to receive a request to modify the availability state of the version of the service. The processor is coupled to the at least one memory and the communication unit, and is operable to: modify the availability state of the version of the service stored in the at least one memory in accordance with the request, wherein the availability state is modified to: (i) unavailable in a case where the request includes an instruction to disable the version of the service, and (ii) available in a case where the request includes an instruction to enable the version of the service. The service is associated with a secure element profile.

In yet another embodiment, a method of managing the availability of a function comprising at least one receiving and modification step is described. A request to modify an availability state of a function is received. The availability state of the function is modified in accordance with the request. The availability state is modified to: (i) unavailable in a case where the request includes an instruction to disable the function, and (ii) available in a case where the request includes an instruction to enable the function. The function is associated with a secure element.

In still a further embodiment, a non-transitory computer readable storage medium having stored thereon instructions which, when executed by a system including at least one processor and at least one memory, cause the system to perform at least one receiving and modification step is described. A request to modify an availability state of a version of the service, the availability state of the service being stored in a memory, is received. The availability state of the version of the service stored in the memory is modified in accordance with the request. The availability state is modified to: (i) unavailable in a case where the request includes an instruction to disable the version of the service, and (ii) available in a case where the request includes an instruction to enable the version of the service. The service is associated with a secure element profile.

BRIEF DESCRIPTION OF THE DRAWINGS

The features and advantages of the present invention will become more apparent from the detailed description set forth below when taken in conjunction with the following drawings.

DETAILED DESCRIPTION

Mobile Commerce System

Figure 1:
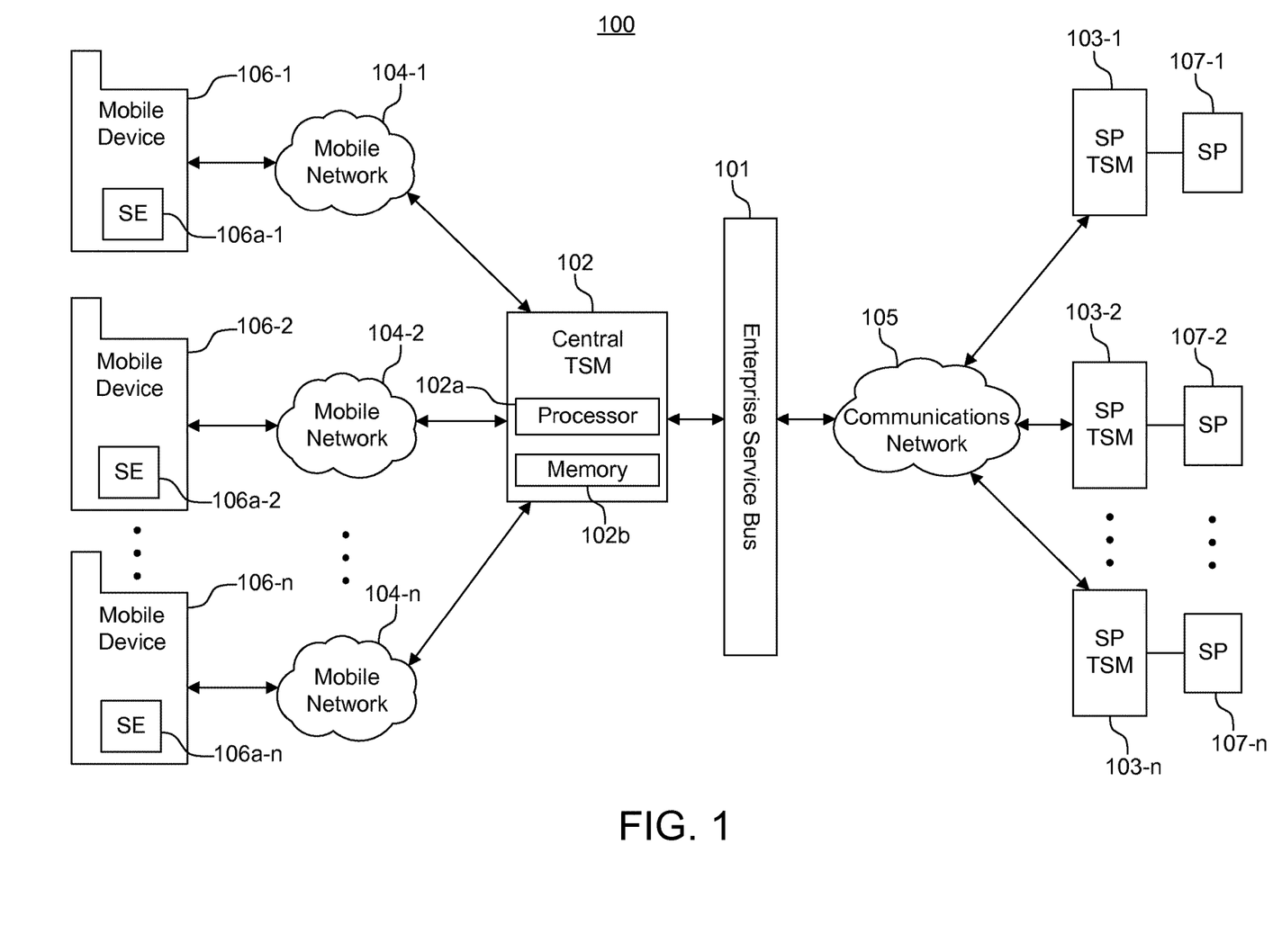
FIG. 1 is an overview of a mobile commerce system according to an example embodiment.

FIG. 1 is a diagram of an example mobile commerce system 100. The system allows service providers to efficiently communicate with mobile devices over a mobile network. As shown in FIG. 1, system 100 includes service provider trusted service managers ("SP TSM") 103-1, 103-2, . . . , 103-n (collectively "103"). Each of the SP TSMs 103 corresponds to a service provider 107-1, 107-2, . . . , 107-n (collectively "107"). A service provider 107 is an entity that provides one or more services to a user through one or more applications, applets, codes, or packages stored on the user's mobile device and/or secure element. Each SP TSM 103 serves as an intermediary between the service providers 107 and other entities including secure elements, MNOs, and another type of TSM (referred to herein as a "central TSM" 102), which may be managed, for example, by a mobile wallet provider.

Through a corresponding SP TSM 103, a service provider 107 can provide applications or instructions regarding those applications to the central TSM 102. As such, each of the SP TSMs 103 is communicatively coupled to the central TSM 102 via a communications network 105. Communications network 105 may be a virtual private network (VPN), a network using Transfer Control Protocol (TCP)/Internet Protocol (IP) standards (e.g., Hypertext Transfer Protocol (HTTP) standards), or the like. Each of the SP TSMs 103 and the central TSM 102 may also secure these communications by using security protocols such as Secure Socket Layer (SSL), Transport Layer Security (TLS), or the like. Each of the SP TSMs 103 may also communicate with the central TSM 102 by using an application programming interface (API) such as a web service API.

In an exemplary embodiment, the central TSM 102 includes a processor 102a and a memory 102b. The central TSM 102 may be implemented via software stored on the memory 102b to serve as an intermediary between the SP TSMs 103 and the secure elements 106a-1, 106a-2, . . . , 106a-n (collectively "106a"). Secure elements 106a may be hardware and/or software implemented to store sensitive information and/or code applets, applications and packages. Physically, the secure element may be implemented as a universal integrated circuit card, an embedded secure element, or a micro secure digital (micro SD) card. Alternatively, the secure element may be implemented as a secure storage communicatively connected to the mobile device. For example, such a secure element may be cloud-based, virtual or remote storage.

More specifically, the central TSM 102 provides each of the SP TSMs 103 with means to, for example, load, modify, install, or delete applications on the secure elements 106a. In addition, the SP TSMs 103, through the central TSM 102, can request pre-personalization of a secure element 106a or personalization of a payment service. That is, the central TSM 102 manages the communications between the SP TSMs 103 and the secure elements 106a.

To manage the communications between the SP TSMs 103 and the secure elements 106a, the central TSM 102 is constructed to communicate with a plurality of service providers 107 and SP TSMs 103, and with a plurality of secure elements 106a over a plurality of mobile networks 104-1, 104-2, . . . , 104-n (collectively "104"). In one embodiment, the central TSM 102 may include or be communicatively coupled to an enterprise service bus (ESB) 101. The ESB 101 is an architecture model for implementing the interactions and communications between entities (e.g., secure elements 106a, SP TSMs 103, central TSM 102). In one example embodiment, the functions described herein that are performed by the central TSM 102 may be performed by an ESB (e.g., ESB 101) or any system or device that is specifically programmed to perform such functions.

As noted above, the central TSM 102 is communicatively coupled to the secure elements 106a via corresponding mobile networks 104 used and/or managed by corresponding MNOs. Generally, the mobile networks 104 are used by MNOs to provide wireless communications services. The mobile networks 104 may be mobile phone cellular networks, radio networks, or the like. The central TSM 102 may communicate with the secure elements 106a, via the mobile networks 104, using security protocols such as Global Platform secure channel protocol, SSL, TLS, or the like.

The secure elements 106a are associated with corresponding mobile devices 106-1, 106-2, . . . , 106-n (collectively "106"), respectively. The secure elements 106a may be communicatively coupled to one or more processors and one or more memories, for example, of their respective mobile devices 106.

As discussed above, the secure elements 106a may include code, applets, applications, and packages. These items may be provided by service providers 107, mobile network operators, or a system administrator, and may be preloaded on the secure element 106a at the time of manufacture. Packages may include uninstantiated applets and/or applications, and may be loaded on the secure element 106a, for example, over-the-air (OTA). Applets and/or applications on the secure element 106a may also be in uninstantiated or instantiated form. Uninstantiated applets and/or applications may be loaded on the secure element 106a and later instantiated to create one or more instances of said applet and/or application. In addition, applets and/or applications may be loaded, for example, OTA after the secure element 106a has been manufactured (e.g., after delivering the secure element 106a to a user).

Applets and applications may be generic or non-generic. Non-generic applets and applications correspond to a single service provider 107. For example, applets or applications corresponding to a single service provider's coupon or loyalty program are non-generic. Data used and/or associated with a non-generic applet or application (e.g., offers, coupons) may be stored in the secure element 106a or in memory outside of the secure element 106a (e.g., non-volatile memory of a mobile device 106).

Generic applets and applications can be used by multiple service providers 107. For example, a payment network application (e.g., MasterCard®) may be instantiated for multiple service providers 107 by the central TSM 102, and therefore used by more than one service provider.

Exclusive ownership, control, and/or management of uninstantiated applets or applications allows a single entity to efficiently and cost effectively supervise the applets and/or applications. Further, exclusive ownership, control, and/or management increases security and minimizes the complexities caused by multiple service providers loading and controlling different applets and/or applications on a secure element 106a. For example, a service provider may utilize an instance of an uninstantiated applet and/or application instead of certifying and installing an independent applet or application on the secure element 106a.

An application, applet, package, or code, when executed by a processor causes the mobile device 106 to perform a corresponding service (e.g., make a payment, receive a coupon, or receive an advertisement, etc.). An applet or application on a secure element 106a may function pursuant to requirements established by Global Platform, Europay, MasterCard®, Visa® (EMVCo.), MNOs, and payment networks (e.g., MasterCard®, Visa®, Discover®, American Express®). Applets or applications may be, for example, Expresspay™ payWave™, PayPass™, Zip™, and the like.

Secure Element Profiles

Since mobile devices 106 operate on different mobile networks (104-1, 104-2, . . . , 104-n) and the secure elements 106a may have different hardware configurations, the central TSM 102 maintains a secure element profile that contains information regarding each of secure elements 106a. A secure element profile defines specific hardware and software features (e.g., installed applets and applet versions) of a given secure element. One example of a secure element profile, including fields and descriptions of information of the secure element profile, is shown below. It should be understood that the following is simply an example, and that a secure element profile might contain more, fewer, or different fields.

| FIELD | DESCRIPTION |
| --- | --- |
| SE Profile Name | Name of secure element profile (e.g., UICC_01_P01001) |
| SE Profile Version | Version number of secure element profile |
| Applet A Version | Version of an applet named Applet A |
| Applet B Version | Version of another (different) Applet named Applet B |
| Applet C Version | Version of another (different) Applet named Applet C |
| Contactless Applet Version | Version of applet for contactless transactions (e.g., contactless payment) |
| Payment Applet A Version | Version of applet for payment transactions |
| Payment Applet B Version | Version of another (different) applet for payment transactions named Payment Applet B |
| Payment Applet C Version | Version of another (different) applet for payment transactions named Payment Applet C |
| Secure Element Manufacturer | Identity of manufacturer of secure element |
| Secure Element Form Factor | e.g., Universal Integrated Circuit Card, (UICC), embedded |
| Secure Element Pre-personalization | e.g., an identity of a pre-set personalization of the secure element corresponding to the secure element manufacturer |
| Mobile Network Operator (MNO) | Carrier or mobile operator corresponding to a mobile device having a secure element |
| SE Part Number | Part number corresponding to the secure element (e.g., the manufacturer's part number) |
| SE Manufacturer Version | Manufacturer version number corresponding to the secure element, e.g., GP 2.2.1, UICC Configuration v1.0.1, Amendment A, Amendment B, and Amendment C (CGM not supported) |
| JavaCard version | Version number corresponding to the JavaCard, e.g., JavaCard 2.2.2, parts of 3.0.1 for deselect, and Iso & Contactless interface management |
| Available volatile memory space limit | Total amount of volatile memory space available, e.g., 13.5k/18k (total incl. OS 30k) |
| Available non-volatile memory space limit | Total amount of non-volatile memory space available, e.g., 184k/256k |
| Volatile memory assigned at manufacture to trusted security domain | e.g., volatile memory assigned at manufacturer to the trusted security domain for the system described herein |
| Non-volatile memory assigned at manufacture to trusted security domain | e.g., non-volatile memory assigned at manufacturer to the trusted security domain for the system described herein |
| Platform Certificate Number (PCN) | e.g., PCN0012 |
| PCN expiration date | e.g., 14 Feb. 2012 |

Other fields of the secure element profile may include, for example, OS version, GlobalPlatform version, extra capabilities of the secure element (e.g., on-board key generation), loaded applications and their versions, etc.

A secure element profile may include or be associated with a secure element profile availability table, which details, among other things, the applets and/or applications (and their versions) that are compatible with each secure element 106a and/or secure element profile. As noted above, applications may be updated over time with newer versions. However, a newer version of an application may not be compatible with every type of secure element 106a, or even those secure elements 106a with which the previous version of the application was compatible. Such a change in compatibility may be caused by, for example, the newer version of the application requiring a different hardware configuration, and thus rendering it incompatible with older secure elements. Accordingly, the secure element profile availability table includes information on the compatible versions of each application for each secure element profile, as illustrated below in Table 1. It should be understood that a secure element table can be stored in and managed by a central TSM (e.g., central TSM 102), ESB (e.g., ESB 101) or the like.

TABLE 1

| Secure Element Profile Name | Appln. ID | Version(s) | | | Appln. ID | Version(s) | | |
|---|---|---|---|---|---|---|---|---|
| UICC_R1_MNO1 | 101 | 1.0 | 1.1 | — | 102 | 1.0 | 1.1 | 1.2 |
| UICC_R2_MNO1 | 101 | 1.0 | 1.1 | 1.2 | 102 | 1.0 | 1.1 | 1.2 |
| UICC_R1_MNO2 | 101 | 1.0 | 1.1 | — | 102 | 1.0 | 1.1 | 1.2 |
| UICC_R2_MNO2 | 101 | 1.0 | 1.1 | 1.2 | 102 | 1.0 | 1.1 | 1.2 |
| MSD_R1_MNO1 | 101 | 1.0 | 1.1 | — | 102 | 1.0 | 1.1 | 1.2 |
| MSD_R2_MNO1 | 101 | 1.0 | 1.1 | 1.2 | 102 | 1.0 | 1.1 | 1.2 |
| MSD_R1_MNO2 | 101 | 1.0 | 1.1 | — | 102 | 1.0 | 1.1 | 1.2 |
| MSD_R2_MNO2 | 101 | 1.0 | 1.1 | 1.2 | 102 | 1.0 | 1.1 | 1.2 |

Table 1 is an exemplary secure element availability profile table, which includes fields for the secure element profile name, application ID corresponding to the application, and compatible version(s) of the application. In this example, each secure element profile name is based on the type of physical medium embodying the secure element 106a (e.g., universal integrated circuit card (UICC), embedded secure element, or micro SD), the release version (R1, R2), and the mobile network operator over which the mobile device 106 comprising the secure element 106a communicates (MNO1, MNO2). The application ID field (Appln. ID) is a unique numerical value assigned to each application. The version field tracks all versions of the application corresponding to the application ID that are compatible with the secure element profile. For example, secure element profile "UICC_R1_MNO1" is a profile of a first release secure element embodied in a universal integrated circuit card and to be used with mobile network operator 1. Version 1.0 and 1.1 of application 101 are compatible with UICC_R1_MNO1, but not version 1.2. In this example, version 1.2 is incompatible, for example, because the first release (R1) of the UICC lacks the necessary hardware. In contrast, UICC_R2_MNO1, which is the second release (R2) of the UICC is compatible with version 1.2. For similar reasons, version 1.2 of application 101 is also incompatible with UCC_R1_MNO2, MSD_R1_MNO1 and MSD_R1_MNO2. Of course, later versions of an application may be incompatible with a secure element profile for other reasons as well, such as the physical embodiment of the secure element 106a or the mobile network operator.

While multiple versions of an application may be compatible with a secure element 106a, not all versions of that application may necessarily be available at once. Rather, one or more of the compatible versions may be deemed to be available, while the other versions are unavailable. As such, the central TSM 102 is also constructed to store an availability state for each version of the application. Typically, the availability state of the latest version (e.g., most recent or newer version) of an application is set to available. The availability state for each of the application versions shown in Table 1 is represented visually in Table 2 below.

TABLE 2

| Secure Element Profile Name | Appln. ID | Version(s) | | | Appln. ID | Version(s) | | |
|---|---|---|---|---|---|---|---|---|
| UICC_R1_MNO1 | 101 | 1.0 | *1.1* | — | 102 | 1.0 | 1.1 | *1.2* |
| UICC_R2_MNO1 | 101 | 1.0 | 1.1 | *1.2* | 102 | 1.0 | 1.1 | *1.2* |
| UICC_R1_MNO2 | 101 | 1.0 | *1.1* | — | 102 | 1.0 | 1.1 | *1.2* |
| UICC_R2_MNO2 | 101 | 1.0 | 1.1 | *1.2* | 102 | 1.0 | 1.1 | *1.2* |
| MSD_R1_MNO1 | 101 | 1.0 | *1.1* | — | 102 | 1.0 | 1.1 | *1.2* |
| MSD_R2_MNO1 | 101 | 1.0 | 1.1 | *1.2* | 102 | 1.0 | 1.1 | *1.2* |
| MSD_R1_MNO2 | 101 | 1.0 | *1.1* | — | 102 | 1.0 | 1.1 | *1.2* |
| MSD_R2_MNO2 | 101 | 1.0 | 1.1 | *1.2* | 102 | 1.0 | 1.1 | *1.2* |

As shown in Table 2, versions of the application highlighted in bold and italics have availability states set to "available" while other versions of that application (which are not highlighted in bold) are set to unavailable.

Information on the availability states is especially useful when the secure element 106a is to be activated or personalized. The secure element 106a communicates with the central TSM 102 to determine whether the uninstantiated applications are the latest versions. This process is illustrated in FIG. 2.

Figure 2:
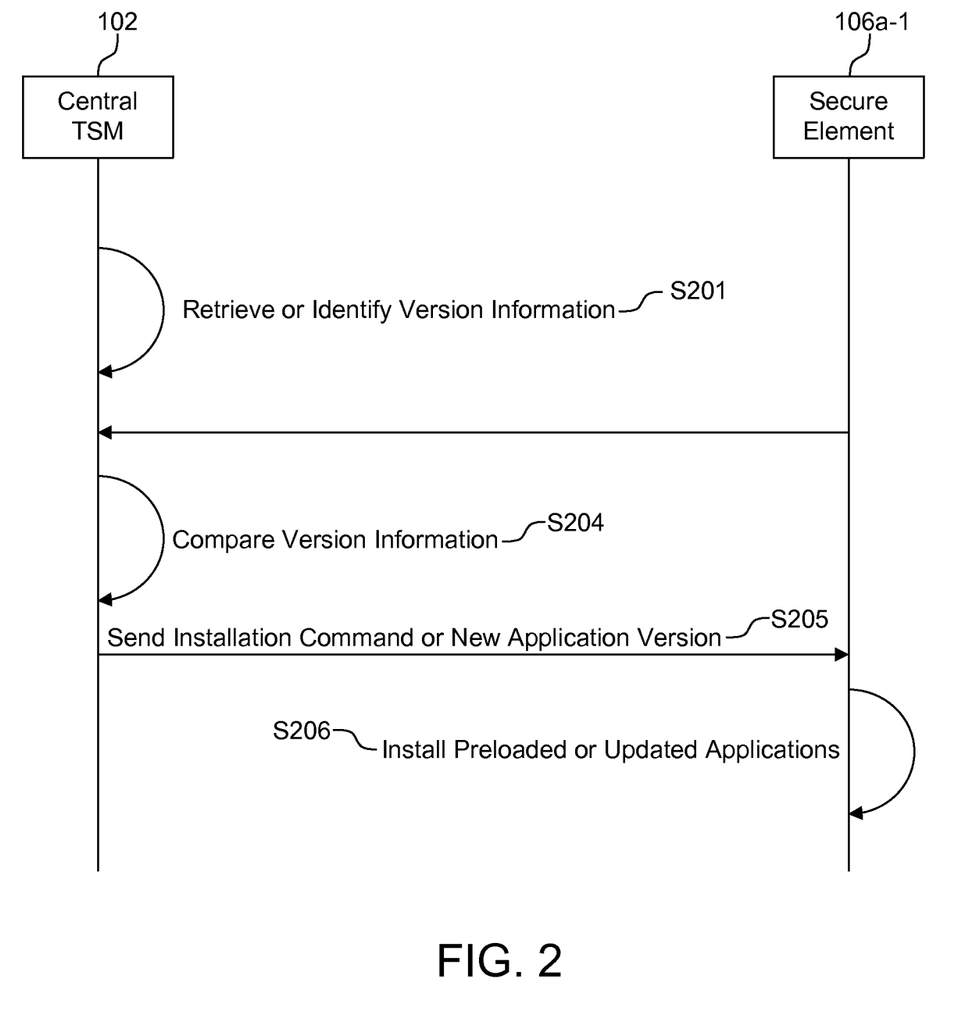
FIG. 2 is a sequence diagram of an installation operation according to an example embodiment.

As shown in FIG. 2, upon the central TSM 102 determining that installation of an application is to be performed, the central TSM 102 retrieves or identifies information regarding the version of the corresponding application loaded on the secure element 106a (S201). This may be done, for example, by analyzing the information in the secure element profile corresponding to the secure element 106a, which is maintained in and by the central TSM 102. The central TSM 102, in turn, compares the version information retrieved from the secure element profile corresponding to the secure element 106a with the information in the secure element profile availability table (S204). If the result of the comparison is that the latest compatible version of the application is loaded on the secure element 106a, the central TSM 102 sends an installation command to the secure element 106a to install the loaded version of the application. If, however, a newer version of the application is compatible and available, the newer version of the application is sent to the secure element 106a via a corresponding mobile network 104 (S205). Upon receipt of either the installation command or the newer version of the application, the corresponding version of the application is installed on the secured element 106a (S206).

Figure 3:
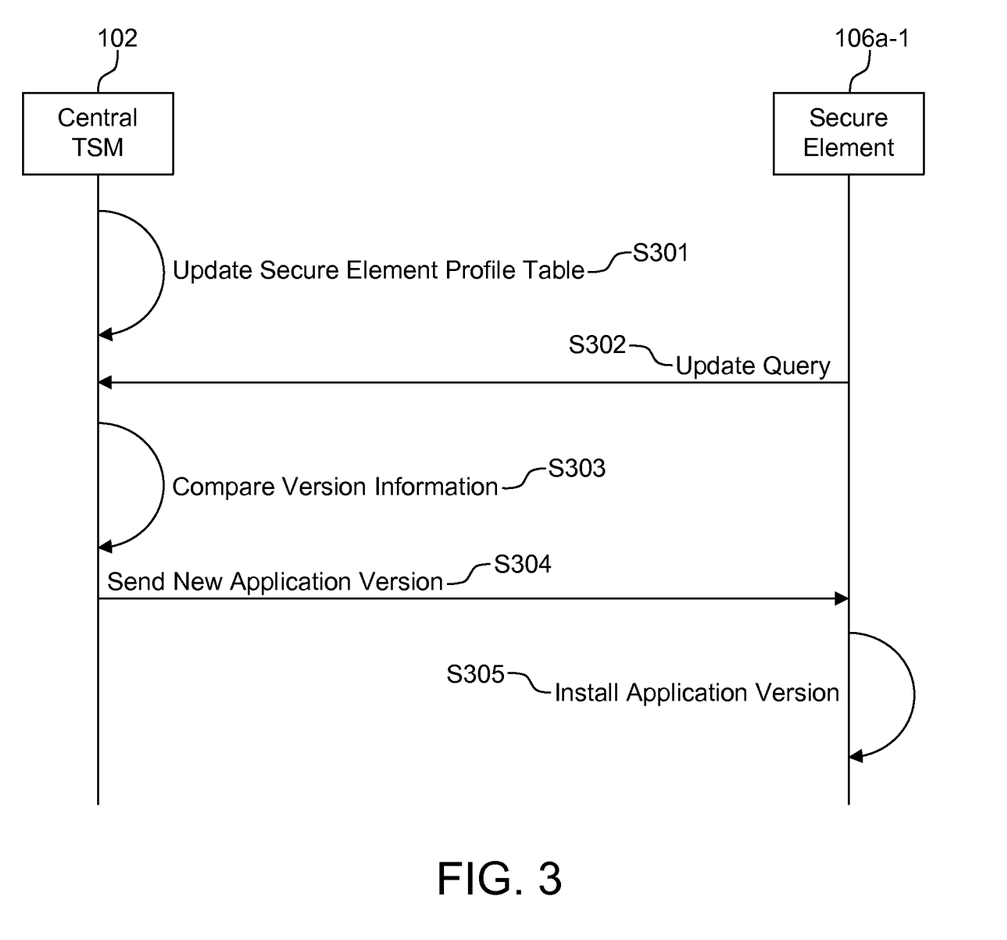
FIG. 3 is a sequence diagram of an upgrade operation according to an example embodiment.

A similar process is performed when the central TSM 102 identifies or determines that a new version of an application is available for installation on secure elements, as illustrated in FIG. 3. First, the central TSM 102 updates the secure element profile availability table (Table 1) to show that a new compatible version of an application is available for one or more secure element profiles (S301). The availability state of the previous (e.g., earlier) compatible version of the application is set to unavailable, and the availability state of the new version of the application is set to available. Next, an update query is received from the secure element 106a (via the mobile device 106) (S302). Typically, the mobile device 106 is configured to periodically check for updated applications. The update could be performed at a predetermined time or during a period where the mobile device 106 is not in use. Information about the versions of applications installed on the secure element 106a is stored and managed by the central TSM 102 (S302). The central TSM 102 then compares that version information to the available version for the corresponding secure element profile availability table (S303). Since the secure element profile availability table has been updated to reflect the availability of a new version of an application, particularly that the availability state of the new version of the application is set to available, the new version of the application is sent to the secure element 106a (S304) and installed (S305), in turn.

If the new version of the application is a critical update, then rather than waiting for the update query (S302) from the mobile device 106, the central TSM 102 can push the new application version to all the secure elements 106a corresponding to the secure element profile that includes the updated application.

Modifying the Availability State of a Version of an Application

As discussed above, with the release of a new version of an application, there is a risk that an unforeseen issue may arise that would impair the functionality of the application, or worse, cause the secure element 106a to become inoperative. As discussed below, however, by modifying the availability state of the malfunctioning version, the rollout of the malfunctioning version can be stopped quickly and efficiently.

Figure 4:
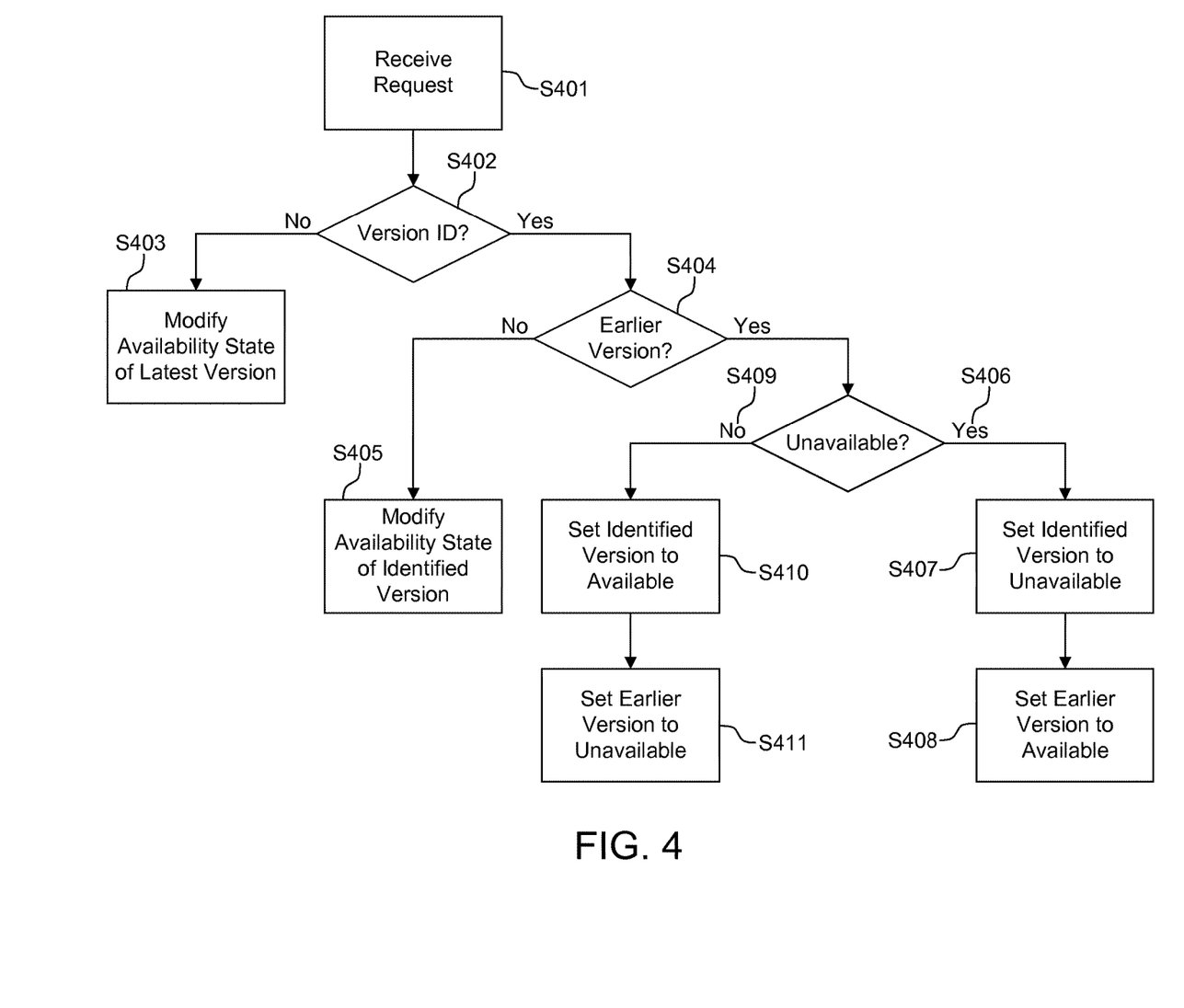
FIG. 4 is a flowchart illustrating the steps of modifying the availability state of a version of an application according to an example embodiment.

FIG. 4 is a flowchart illustrating the steps of modifying the availability state of a version of an application. In step S401, the central TSM 102 receives a request to modify the availability state of a version of an application. The request includes a secure element profile name or identifier, application ID of an application, and a requested action (e.g., whether the availability state is to be modified to available or unavailable). The request may also include the version ID (e.g., version 1.0, 1.1, 1.2, etc.) of a specific version of the application whose availability state is to be modified. An exemplary request is illustrated below in Table 3.

TABLE 3

| Secure Element Profile Name | Application ID | Version ID | Available/Unavailable |
|---|---|---|---|
| UICC_R2_MNO1 | 101 | 1.2 | Unavailable |

The request may originate from a system administrator acting on the central TSM 102, for example, through a web portal, or may be received from a service provider 107 through one of the SP TSMs 103. Upon receipt of the request, the central TSM 102 determines whether or not the request includes the version ID of a specific version of the application whose availability state is to be modified. If the request does not identify a specific version of the application, then the availability state of the latest (i.e., most recent) version of the application is modified in accordance with the request (S403). If the request does identify a specific version of the application, then the central TSM 102 determines whether or not an earlier version of the application is compatible with the secure element profile (S404). If no earlier version of the application is present, then the availability state of the identified version of the application is modified in accordance with the request (S405). If, however, it is determined that an earlier version of the application is compatible with the secure element profile in S404, and the request includes an instruction to modify the availability state of the identified version to unavailable, then such a modification is made (S407) and the availability state of the earlier version of the application is modified to available (S408).

In an alternative embodiment, even if the request does not include a version ID (e.g., does not identify a specific version of the application), the central TSM 102 may refer to the secure element profile availability table to determine whether there is an earlier version of the application compatible with the secure element profile. If so, the central TSM 102 may modify the availability state of that earlier version to available when the availability state of the latest version is modified to unavailable.

Assuming the secure element profile availability table shown in Table 2 is modified in accordance with the request shown in Table 3, the availability state of version 1.2 of the application corresponding to application ID 101 is set to unavailable for secure element profile UICC_R2_MNO1. Moreover, because the request shown in Table 3 includes a version ID (version 1.2), the central TSM 102 determines that an earlier version of the application is compatible with the secure element profile (namely version 1.1), and will modify the availability state of the earlier compatible version to "available." After these operations are performed, the salient portion of the secure element profile availability table shown in Table 3, will appear as shown in Table 4 below.

TABLE 4

| Secure Element Profile Name | Appln. ID | Version(s) | | | Appln. ID | Version(s) | | |
|---|---|---|---|---|---|---|---|---|
| UICC_R2_MNO1 | 101 | 1.0 | 1.1 | 1.2 | 102 | 1.0 | 1.1 | 1.2 |

In the case that the availability state of version 1.2 of the application corresponding to application ID 101 is set to unavailable, when the central TSM 102 compares information (in S204 and S5303) from a secure element 106a regarding the version of the application corresponding to Appln. ID 101 to information in the secure element profile availability table, the central TSM 102 determines version 1.1 of the application to be the latest available version of the application. By changing the availability state of version 1.2 to unavailable, the central TSM 102 may no longer provide or make available version 1.2 to the secure elements 106a, and the rollout of version 1.2 is stopped.

Through a similar process to the one described above, it also possible to make the latest version of an application, or a specific version of an application, available to the secure elements 106a. Such a process is useful when, for example, the error in the malfunctioning version of the application has been corrected.

Returning to FIG. 4, the central TSM 102 receives a request from a system administrator or from an SP TSM 103 to modify the availability state of a version of an application (S401). The central TSM 102 determines whether the request identifies a specific version of the application whose availability state is to be modified based on whether the request includes a version ID (S402). If the request does not include a version ID, then the availability state on the secure element profile availability table for the latest version of the application is modified in accordance with the request (S403). If the request includes a version ID and thus identifies a specific version of the application to modify, the central TSM 102 in turn determines whether there is an earlier compatible version (S404). If no earlier compatible version is identified, then the availability state of the identified version of the application is modified in accordance with the request (S405). If there is an earlier compatible version, but the request includes an instruction to modify the availability state of the identified version of the application to available (i.e., NO in S409), the availability state of the identified version is modified to available (S410), and the availability state of the earlier version of the application is modified to unavailable (S411).

The central TSM 102 is also constructed to generate an error message that can be delivered to a system managed by a system administrator, for example, in the case where the availability state of the version to be modified is equal to unavailable and the request includes an instruction to disable the version of the service. Likewise, the central TSM 102 is constructed to generate an error message when the availability state of the version to be modified is equal to available and the request includes an instruction to enable the version of the service. That is, an error message can be sent by a central TSM 102, for example, when a request includes instructions to modify an availability state to a state in which an application is already in.

Managing the Availability of Functions

Figure 5:
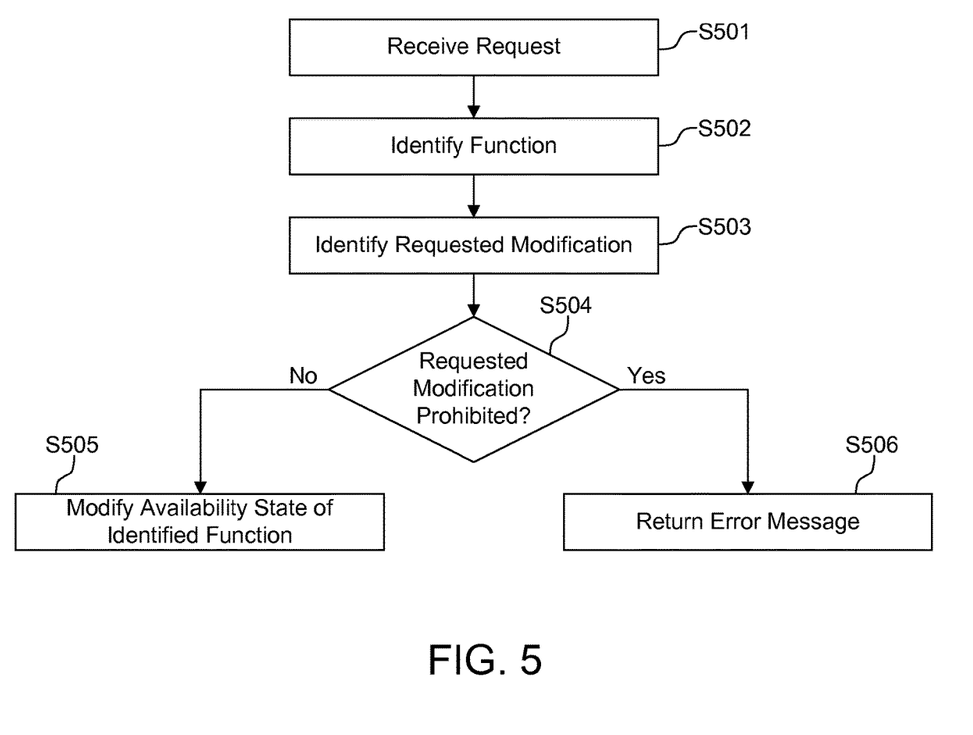
FIG. 5 is a flowchart illustrating the steps of modifying the availability state of a function according to an example embodiment.

As described above, the central TSM 102 can modify the availability state of versions of applications stored on the secure element 106a. The central TSM 102, however, also is constructed to modify the availability state of a function. A function is a representation of executable code that when executed by the central TSM 102 causes one or more processes to be performed. Functions may be manifested as application program interfaces (APIs) that are exposed to some or all of the service providers 107, mobile network operators, and other systems managed by system administrators. Table 5 is an exemplary list of such functions and their description.

TABLE 5

| Function Name | Function ID | Description | Availability State |
|---|---|---|---|
| LOCK APPLICATION | 0001 | Prevents use of an application on a secure element | Available |
| UNLOCK APPLICATION | 0002 | Allows use of a locked application on a secure element | Available |
| INSTALL APPLICATION | 0003 | Installs an application on a secure element | Available |
| REMOVE APPLICATION | 0004 | Removes an installed application from a secure element | Available |
| RENEW APPLICATION | 0005 | Renews an expired application on a secure element | Available |
| CHECK ELIGIBILITY | 0006 | Checks whether a user is eligible to use an application to be installed on the secure element | Available |
| INSTALL MOBILE WALLET | 0007 | Installs the mobile wallet on the mobile device | Available |
| INSTALL WALLET WITH PERSONALIZATION | 0008 | Installs the mobile wallet and executes a personalization routine | Available |
| PERSONALIZE WALLET | 0009 | Personalizes the mobile wallet | Available |
| WALLET UPGRADE | 0010 | Upgrades the version of the mobile wallet on the mobile device | Available |
| UPGRADE WITH WALLET PERSONALIZATION | 0011 | Upgrades the version of the mobile wallet on the mobile device and executes a personalization routine. | Available |
| UPDATE WALLET PASSCODE | 0012 | Updates the passcode for accessing the mobile wallet | Available |
| UPDATE WALLET HANDSET ID | 0013 | Updates the handset identifier (ID) of the mobile device stored in the secure element. | Available |
| UPDATE WALLET WIDGET | 0014 | Updates the wallet widget stored in the secure element | Available |
| UPDATE WALLET ICC ID | 0015 | Updates the ICC ID stored in the secure element. | Available |
| ACTIVATE WALLET | 0016 | Activates the mobile wallet | Available |
| SEND SCRIPT | 0017 | Sends personalization data to the secure element | Available |
| REDO INSTALLATION | 0018 | Reinstalls an application in a case where personalization failed | Available |
| LOCK AFTER PERSONALIZATION | 0019 | Locks an application on the secure element after personalization | Available |

TABLE 5-continued

| Function Name | Function ID | Description | Availability State |
|---|---|---|---|
| SUSPEND WALLET | 0020 | Informs the central TSM that a user's mobile wallet has been suspended | Available |
| TERMINATE WALLET | 0021 | Informs the central TSM that a user has terminated his/her mobile wallet | Available |
| REACTIVATE WALLET | 0022 | Informs the central TSM that a user has reactivated his/her mobile wallet | Available |

A system may disable, for example, any of the above-referenced functions through or with the assistance of the central TSM 102. In some instances, some functions may not be disabled, such as suspend wallet, terminate wallet, and reactivate wallet functions. As shown in FIG. 5, when the central TSM 102 receives a request to modify the availability state of one or more functions (S501), the central TSM 102 first determines which function(s) is/are identified in the request (S502). Next, the central TSM 102 identifies the requested modification, i.e., whether the availability state is to be modified to available or unavailable (S503). The central TSM 102 in turn confirms that the requested modification is permissible for the identified function (S504). If so, then the availability state of the identified function is modified in accordance with the request (S505). If not, an error message is returned (S506). Thus, for example, if the request sought to modify the availability of the suspend wallet, terminate wallet, or reactivate wallet functions to unavailable, an error message would be generated.

By disabling one or more functions, a system administrator can stop the rollout of a malfunctioning version of an application. For example, by disabling the INSTALL MOBILE WALLET, PERSONALIZE WALLET, INSTALL WALLET WITH PERSONALIZATION, WALLET UPGRADE, or UPGRADE WITH WALLET PERSONALIZATION functions, installation and upgrade functions are disabled, thus preventing a newer version of any application from being disseminated to the mobile devices 106.

As discussed above, by modifying the availability states of versions of applications and functions, the distribution of one or more applications to the secure elements 106a can be quickly and efficiently stopped.

Example Computer-Readable Medium Implementation

Figure 6:
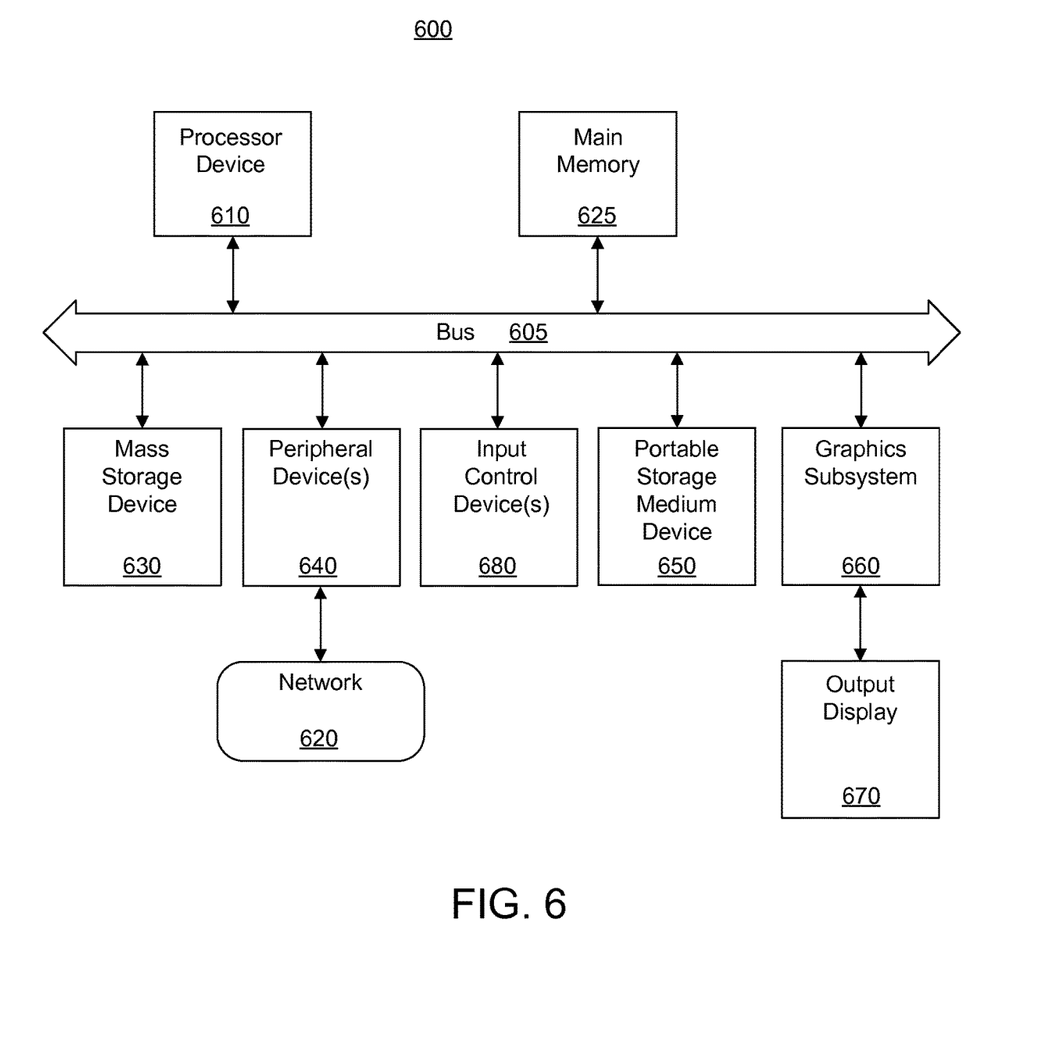
FIG. 6 is a block diagram of a general or special purpose computer according to an example embodiment.

FIG. 6 is a block diagram of a general and/or special purpose computer 600, which may be a general and/or special purpose computing device, in accordance with some of the example embodiments of the invention. The computer 600 may be, for example, a user device, a user computer, a client computer and/or a server computer, among other things.

The computer 600 may include without limitation a processor device 610, a main memory 625, and an interconnect bus 605. The processor device 610 may include without limitation a single microprocessor, or may include a plurality of microprocessors for configuring the computer 600 as a multi-processor system. The main memory 625 stores, among other things, instructions and/or data for execution by the processor device 610. The main memory 625 may include banks of dynamic random access memory (DRAM), as well as cache memory.

The computer 600 may further include a mass storage device 630, peripheral device(s) 640, portable non-transitory storage medium device(s) 650, input control device(s) 680, a graphics subsystem 660, and/or an output display interface 670. For explanatory purposes, all components in the computer 600 are shown in FIG. 6 as being coupled via the bus 605. However, the computer 600 is not so limited. Devices of the computer 600 may be coupled via one or more data transport means. For example, the processor device 610 and/or the main memory 625 may be coupled via a local microprocessor bus. The mass storage device 630, peripheral device(s) 640, portable storage medium device(s) 650, and/or graphics subsystem 660 may be coupled via one or more input/output (I/O) buses. The mass storage device 630 may be a nonvolatile storage device for storing data and/or instructions for use by the processor device 610. The mass storage device 630 may be implemented, for example, with a magnetic disk drive or an optical disk drive. In a software embodiment, the mass storage device 630 is configured for loading contents of the mass storage device 630 into the main memory 625.

The portable storage medium device 650 operates in conjunction with a nonvolatile portable storage medium, such as, for example, a compact disc read only memory (CD-ROM), to input and output data and code to and from the computer 600. In some embodiments, the software for storing information may be stored on a portable storage medium, and may be inputted into the computer 600 via the portable storage medium device 650. The peripheral device(s) 640 may include any type of computer support device, such as, for example, an input/output (I/O) interface configured to add additional functionality to the computer 600. For example, the peripheral device(s) 640 may include a network interface card for interfacing the computer 600 with a network 620.

The input control device(s) 680 provide a portion of the user interface for a user of the computer 600. The input control device(s) 680 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 600 may include the graphics subsystem 660 and the output display 670. The output display 670 may include a cathode ray tube (CRT) display and/or a liquid crystal display (LCD). The graphics subsystem 660 receives textual and graphical information, and processes the information for output to the output display 670.

Each component of the computer 600 may represent a broad category of a computer component of a general and/or special purpose computer. Components of the computer 600 are not limited to the specific implementations provided here.

Software embodiments of the example embodiments presented herein may be provided as a computer program product, or software, that may include an article of manufacture on a machine accessible or machine readable medium having instructions. The instructions on the non-transitory machine accessible machine readable or computer-readable medium may be used to program a computer system or other electronic device. The machine or computer-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "computer-readable", "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method to manage secure elements, comprising:
receiving, by a trusted service manager (TSM), a request to disable a version of an applet, the request comprising a secure element profile identifier, the secure element profile identifier being part of a single profile associated with a plurality of secure elements, the single profile accessible to the TSM and describing an availability state of each version of the applet installed in the associated plurality of secure elements;
accessing, by the TSM using the secure element profile identifier, the single profile;
modifying, by the TSM in the single profile accessed, the availability state of the version to indicate that the version is unavailable;
determining, by the TSM, whether an earlier version of the applet installed in the associated plurality of secure elements is compatible with the associated plurality of secure elements based on the single profile accessed;
modifying, by the TSM in the single profile accessed, the availability state of the earlier version to "available," in a case where the TSM determined that the earlier version is compatible with the associated plurality of secure elements; and
transmitting, by the TSM, instructions to the associated plurality of secure elements corresponding to the single profile accessed to conform each version to the single profile accessed as modified.

2. The method according to claim 1, wherein:
the request does not include a version identifier identifying a particular version of the applet, and
modifying the availability state of the version comprises modifying the availability state of two latest versions of the applet in accordance with the request.

3. The method according to claim 1, wherein the applet comprises an application stored on the plurality of secure elements.

4. The method according to claim 1, further comprising:
generating an error message in a case where, prior to the modifying, the availability state of the version is: (i) equal to "unavailable" and the request includes the instruction to disable the version, or (ii) equal to "available" and the request includes the instruction to enable the version.

5. A system to manage availability of applets associated with secure elements, comprising:
at least one memory storing a plurality of profiles, each of the plurality of profiles comprising a secure element profile identifier associated with a plurality of secure elements, each of the plurality of profiles further describing an availability state of at least two versions of an applet installed in the associated plurality of secure elements; and
at least one processor coupled to the at least one memory, wherein the at least one processor executes application code instructions that are stored in the memory to cause the system to:
receive a request to disable a version of an applet, the request indicating one of the secure element profile identifiers;
access, using the one of the secure element profile identifiers, one profile of the plurality of profiles;
modify, in the one profile accessed, the availability state of the version to "unavailable;"
determine whether an earlier version of the applet installed in the associated plurality of secure elements is compatible with the associated plurality of secure elements based on the one profile accessed;
modify, in the one profile accessed, the availability state of the earlier version to "available," in a case where (i) the request includes the instruction to disable the version and (ii) the earlier version is determined to be compatible with the associated plurality of secure elements; and
transmit instructions to the associated plurality of secure elements corresponding to the one profile accessed to conform each version to the one profile accessed as modified.

6. The system according to claim 5, wherein:
the request does not include a version identifier identifying a particular version of the applet, and
modifying the availability state of the version comprises modifying the availability state of the two latest version of the applet in accordance with the request.

7. The system according to claim 5, wherein the applet comprises an application stored on the plurality of secure elements.

8. The system according to claim 5, wherein the processor is operable to generate an error message in a case where, prior to modifying, the availability state of the version is: (i) equal to unavailable and the request includes the instruction to disable the version, and (ii) equal to available and the request includes the instruction to enable the version.

9. A non-transitory computer readable storage medium having stored thereon instructions which, when executed by a system including at least one processor and at least one memory, cause the system to manage availability of applets associated with secure elements, the instructions comprising:
instructions to receive a request to disable a version of an applet, the request comprising a secure element profile identifier, the secure element profile identifier being part of a single profile associated with a plurality of secure elements, the single profile describing an availability state of each version of each applet installed in the associated plurality of secure elements, the single profile being stored remotely from the associated plurality of secure elements;
instructions to access, using the secure element profile identifier, the single profile;
instructions to modify, in the single profile accessed, the availability state of the version to indicate that the version is unavailable;
instructions to determine whether an earlier version of the applet installed in the associated plurality of secure elements is compatible with the associated plurality of secure elements based on the single profile accessed;
instructions to modify, in the single profile accessed, the availability state of the earlier version to "available," in a case where the earlier version is determined to be compatible with the associated plurality of secure elements; and
instructions to transmit instructions to the associated plurality of secure elements corresponding to the single profile accessed to conform the applet to the single profile accessed as modified.

10. The computer readable medium according to claim 9, wherein the request does not include a version identifier identifying a particular version of the applet, the instructions to modify the availability state of the version comprises instructions to modify a latest two versions of the applet stored in the memory in accordance with the request.

11. The computer readable medium according to claim 9, wherein the applet comprises an application stored on the associated plurality of secure elements.

12. The computer readable medium according to claim 9, wherein the instructions further comprise instructions to generate an error message in a case where, prior to modifying, the availability state of the version is: (i) equal to "unavailable" and the request includes the instruction to disable the version, or (ii) equal to "available" and the request includes the instruction to enable the version.

* * * * *